United States Patent

[11] 3,563,347

[72] Inventor Heinz Gunter Hahm
 Frankfurt am Main, Germany
[21] Appl. No. 853,047
[22] Filed Aug. 26, 1969
 Division of Ser. No. 696,847, Jan. 10, 1968,
 Patent No. 3,490,563.
[45] Patented Feb. 16, 1971
[73] Assignee Alfred Teves G.m.b.H.
 Frankfurt am Main, Germany
[32] Priority Jan. 20, 1967
[33] Germany
[31] T33029

[54] DISK BRAKE WITH NOISE-LIMITING
 BRAKESHOE
 8 Claims, 8 Drawing Figs.
[52] U.S. Cl. .................................................. 188/73.1,
 188/250
[51] Int. Cl. .................................................. F16d 65/02
[50] Field of Search ............................................. 188/73, 1
 (B), 25 (DB)

[56] References Cited
 UNITED STATES PATENTS
3,113,643 12/1963 Botterill ...................... 188/73
3,298,468 1/1967 Buyze .......................... 188/23
3,378,116 4/1968 Hennig ........................ 188/250(B)
 FOREIGN PATENTS
1,346,810 11/1963 France ........................ 188/73
Primary Examiner—George E. A. Halvosa
Attorney—Karl F. Ross ABSTRACT: A brakeshoe adapted to limit noise generated by a disc brake wherein an intermediate plate, interposed between the backing plate of the brakeshoe and the piston, is affixed to the backing plate and provides force transmission between the piston and the backing plate which is offcenter from the centrum of the disc-engaging surface of the brake lining, the force-transmitting portion consisting at least in part of a thermal insulator.

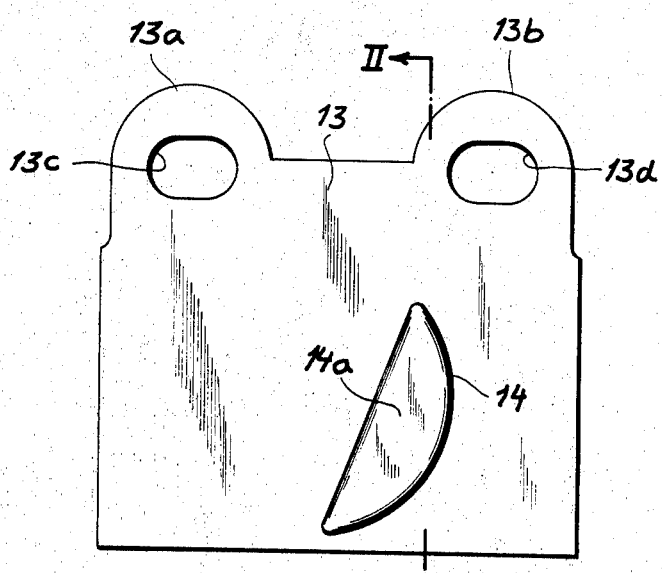
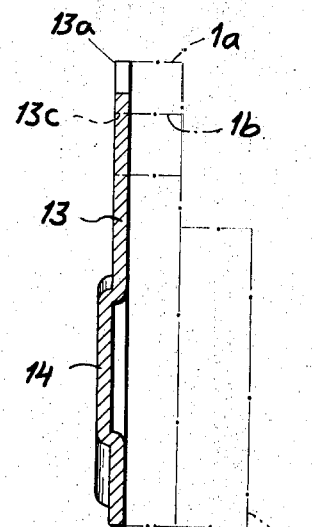
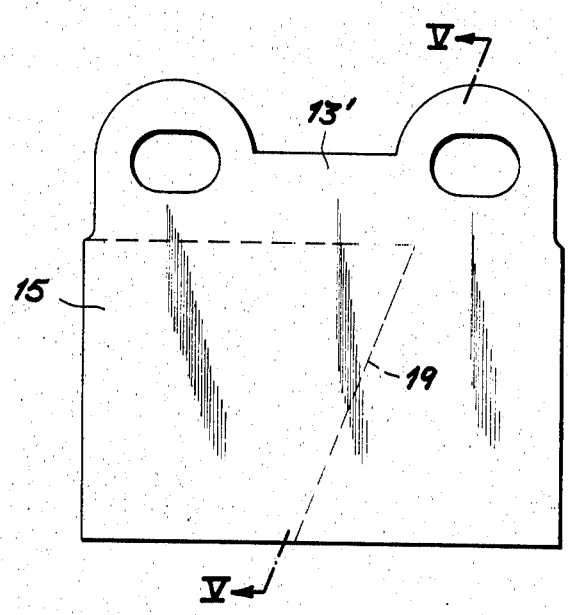
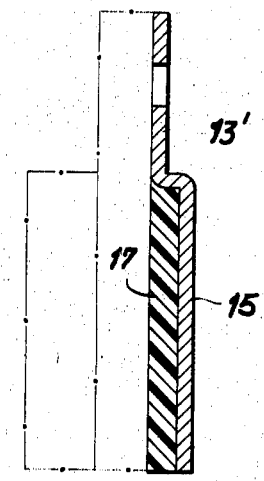
INVENTOR:
Heinz G. Hahm

INVENTOR:
Heinz G. Hahm

BY

Karl J. Ross
Attorney

DISK BRAKE WITH NOISE-LIMITING BRAKESHOE

This application is a division of application Ser. No. 696,847 filed Jan. 10, 1968 (now U.S. Pat. No. 3,490,563).

My present invention relates to antinoise disc-brake assemblies and, more particularly, to a noise-limiting brakeshoe for use in such assemblies.

In my application Ser. No. 688,185, copending with the parent case and now U.S. Pat. No. 3,442,356, I have pointed out that disc-type brakes offer considerably advantages over internal-expanding brakes for many automotive-vehicle applications.

Thus, for example, the disc brake is more readily responsive to brake-pedal actuation of the master cylinder, provides a firmer engagement of the rotating surface, and requires a smaller stroke and less fluid displacement than most internal expanding brakes. The disc brake generally comprises a rotating brake disc coupled with the vehicle wheel or axle and having a pair of annular braking faces lying in planes transverse to the axis of rotation of the disc.

Flanking the disc, and juxtaposed with these annular braking faces over only a fraction of the disc surface, are a pair of brakeshoes which are of segmental configuration and engage only limited regions of the braking faces.

Such brakeshoes are mounted in a yoke or housing which is connected to a nonrotatably portion of the vehicle, e.g. the axle housing or chassis, and are urged by respective wheelbrake pistons against the disc. To this end, wheelbrake cylinders are formed in the yoke and are connected by hydraulic lines with the master cylinder.

In other modifications of this basic system, only a single wheelbrake cylinder is provided and either the disc or the yoke is axially shiftable or deflectable to bring the opposite face of the disc into engagement with a brakeshoe fixed on the yoke when the piston urges its brakeshoe against the disc.

In that application and in earlier, commonly assigned application Ser. No. 601,013 filed Dec. 12, 1966 (now U.S. Pat. No. 3,409,106 of Nov. 5, 1968) and Ser. No. 672,757 filed Oct. 4, 1967 (now abandoned), it has been pointed out that the squealing noises and raucous sounds characteristic of the application of the disc brake appear to be related to the fact that the piston of earlier arrangements bears upon the braking plate of the brakeshoe in line with the center of gravity or centrum of the contact surface of the brake lining with the disc.

These applications observe that a substantial reduction in the noise produced by the disc brake can be ensured by locating the contact zone of the piston and the backing plate of the brakeshoe somewhat off center with respect the the centrum of the contact face of the brake lining with the disc and, advantageously, ahead of the centrum in the direction of rotation of the disc especially on the flange side of the yoke.

The term "flange side" is used herein to designate that lobe or yoke half which is affixed to the axle housing, the other or "wheel side" lobe or yoke half being cantilevered from the flange-side yoke half and lying partly within the dished tire-carrying wheel disc. In the aforementioned application Ser. No. 672,757, a system for accomplishing this offsetting is described and comprises a thin intermediate plate having a bulge or protuberance engageable by the piston or bearing upon the backing plate, this intermediate plate being introduced to shift the location at which the piston acts upon the backing plate of the brakeshoe.

In practice, it has been found that difficulties are encountered when the additional or intermediate plate is loosely disposed between the piston and the brakeshoe, even though this plate may be suspended from the yoke in a manner analogous to the suspension of the brakeshoe. The suspension means may include a pair of guide rods or pins bridging the yoke halves on opposite sides of the disc and lying just outwardly therefrom the intermediate plate being coextensive with the backing plate of the brakeshoe and having, like the brakeshoe, a pair of lugs whose apertures slidably receive the pins. A disadvantage of the intermediate plate resides in the fact that, unless the yoke is modified, the intermediate plate must be formed from relatively thin sheet metal and tends to deform under the substantial hydraulically generated brake force. Furthermore, the plate can be lost easily when the brakeshoes are replaced and can also fall out of place if improperly suspended from the yoke.

It is the principal object of the present invention, therefore, to provide a disc-brake system which carries forward some of the principles originally disclosed in application Ser. No. 672,757 and eliminates the difficulties hitherto encountered with the use of loosely positioned intermediate plates.

A more specific object of this invention is to provide an improved noise-limiting brakeshoe assembly which can be used in existing disc-brake arrangements and which will obviate the problems encountered heretofore as described above.

In accordance with the basic feature of this invention, a brakeshoe for a disc-brake assembly comprises, in addition to a metallic backing plate to which the brake lining is bonded, an intermediate plate constructed to shift the zone of force application by the wheel-brake piston to a location offset from the centrum of the braking face of the lining, the intermediate plate being rigidly connected with the backing plate and also consisting of a metal (preferably sheet metal).

I have discovered that a number of configurations of the backing plate and the intermediate plate rigidly connected therewith are possible. Thus the intermediate plate can be provided with a force-transmitting element extending transversely to the intermediate plate in the direction of the backing plate to engage the latter with surface contact, the contact surface having a centrum offset from the centrum of the brake lining; this element may receive an insulating layer or may be an insulating member of a width less than that of the plates, which are preferably coextensive.

The insulating member, which is independent of the two plates, can be sandwiched between the latter to space them apart or may be guided in the intermediate plate. When the intermediate member is a plate, it may have a circular cutout or a cutout of arc-segmental configuration provided with the attaching means; the abutment member between the two plates may have the shape of a disc or segment passing through the cutouts. The abutment element may also be a formation provided upon the formation-carrying plate with a height greater than the thickness of this latter plate and turned away from or toward the backing plate of the brakeshoe. The element-support plate may be provided with the formation by cementing it to, sliding it onto or pressing it into the formation-support plate and may be composed of a synthetic resin or ceramic of low thermal conductivity. The insulating element may, moreover, extend over the greater part of the force-transfer zone between the piston and the backing plate of the brakeshoe and thus perform the dual function of limiting hear transfer and reducing noise.

The above and other objects, features and advantages of the present invention will become more readily apparent from the following description, reference being made to the accompanying drawing in which:

FIG. 1 is an elevational view of an intermediate plate according to the invention;

FIG. 2 is a cross-sectional view along the line II–II of FIG. 1;

FIG. 3 is an elevational view of still another intermediate plate;

FIG. 5 is a cross-sectional view along the line V–V of FIG. 3;

Figure 4:
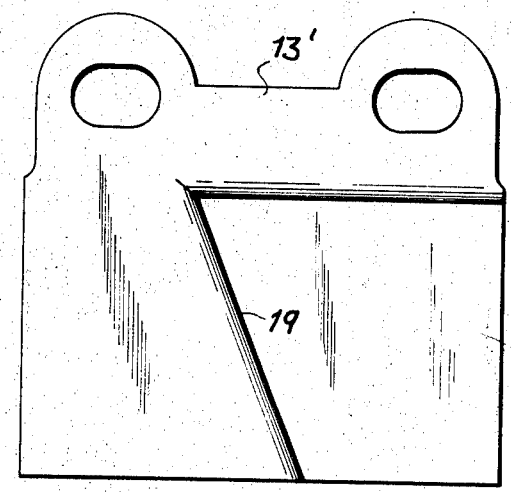
FIG. 4 shows the other side of this plate.

In FIG. 1 of the drawing I show a plate adapted to be interposed between the backing plate 1 of the brakeshoe of a disc brake and the piston thereof to reduce squeal in accordance with the principles set forth in my application Ser. No. 696,847. The brakeshoe may have a backing plate 1 of rectangular configuration with upstanding lugs 1a whose apertures 1b form guides by which the brakeshoe is extended from the axially extending guide pins of the disc-brake yoke. The brake lining 3 may be of arc segmental shape and is composed of a ceramic. It may be bonded to one side of the metallic backing plate which can be composed of sheet metal (e.g. steel plate) or a light metal (e.g. aluminum).

The plates of the present invention rest along the opposite side of the backing plate of the disc brake and, in turn, receive force from an annular service zone of the piston. In the embodiment illustrated in FIGS. 1 and 2, the plate 13 is composed of sheet metal and is embossed with an arc segmental protuberance 14 having a plate surface 14a best seen in FIG. 1, corresponding to a plateau. This bulge is engaged by the piston. The body of the plate 13 may be provided with lugs 13a and 13b whose openings 13c and 13d receive the suspending and alignment pins previously mentioned. The intermediate plate 13 may be secured to the backing plate 1 by spot, roller or other resistance welding or by cold welding techniques.

In FIGS. 3 and 5, the intermediate plate 13' is formed with a step 15 which runs along a skew line 19 and is filled at 17 with a synthetic resin plate as best seen in FIG. 5. In both embodiments, the recess formed by the step has a depth equal approximately to twice the thickness of the embossed metal sheet so that in the region of the step or bulge, the plate has twice the thickness of the sheet metal. Note also that the segment of FIGS. 1 and 2 has a skew line constituting the cord along which the segment is taken.

Figure 6:
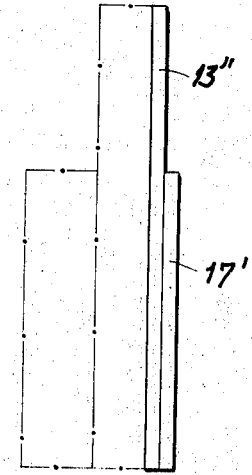
FIG. 6 is a side-elevational view of another intermediate plate illustrating the invention.
Figure 7:
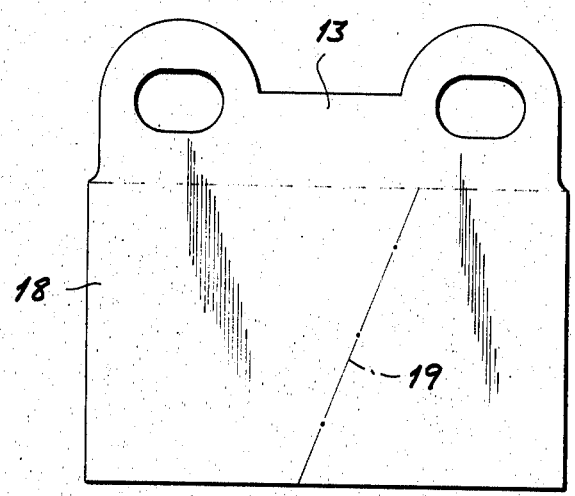
FIG. 7 is an elevational view of the plate of FIG. 6.
Figure 8:
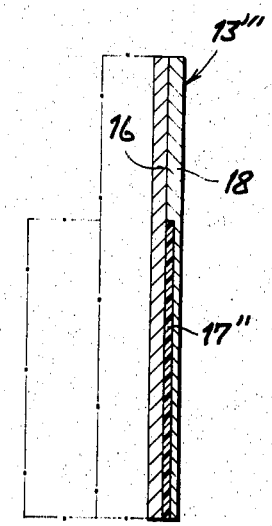
FIG. 8 is a cross-sectional view through a composite intermediate plate.

In the embodiment of FIGS. 6 and 7, the synthetic resin plate 17' is shown to be mounted directly on the support plate 13" to form a step (FIG. 6) or else a pair of plates 16, 18 may sandwich this synthetic resin or vibrex plate 17" between themselves to form a carrier 13''' therefor. The plates of FIGS. 7 and 8 are particularly desirable when stepped pistons are employed, see commonly assigned application Ser. No. 601,013 (U.S. Pat. 3,409,106) while the embodiments of FIGS. 5 and 6 may be used when smooth faced pistons are employed (see application Ser. No. 672,757).

I claim:
1. A disc brake including a noise-limiting brakeshoe, a rotating brake disc engageably by a face of said brakeshoe, and a piston shiftable perpendicularly to said face to urge said brakeshoe against said disc; said brakeshoe comprising a rigid backing plate extending generally parallel to said face, a brake lining secured to said backing plate and forming said face, and two further plates rigidly secured to the other side of said backing plate for engagement by said piston, said further plates contacting each other along a surface parallel to said face, one of said further plates having a recess at said surface and being provided with a layer of thermally insulating material in said recess substantially coextensive in area with said lining.

2. A disc brake as defined in claim 1 wherein said layer consists of synthetic resin.

3. A disc brake including a noise-limiting brakeshoe, a rotating brake disc; engageable by a face of said brakeshoe, and a piston shiftable perpendicularly to said face to urge said brakeshoe against said disc; said brakeshoe comprising a rigid metal backing plate extending generally parallel to said face and a brake lining secured to said backing plate along one side thereof while forming said face, said backing plate having a planar other side of an area exceeding that of said lining; and an intermediate plate substantially coextensive.

4. The brakeshoe as defined in claim 3 further comprising a layer of thermally insulating material received in said recess.

5. The brakeshoe as defined in claim 4 wherein said layer is a plate of a synthetic resin.

6. The brakeshoe as defined in claim 4 wherein said layer is sandwiched between said intermediate plate and said backing plate.

7. The brakeshoe as defined in claim 4 wherein said step has arc-segmental configuration.

8. The brakeshoe as defined in claim 4 wherein said step has a flank lying at an angle to a median plane of said plates perpendicular thereto.